(12) United States Patent
Maeyama et al.

(10) Patent No.: US 8,408,142 B2
(45) Date of Patent: Apr. 2, 2013

(54) GUIDE RAIL TYPE VEHICLE WITH GUIDE DEVICE

(75) Inventors: Hiroyuki Maeyama, Tokyo (JP); Hiroyuki Kono, Tokyo (JP); Kousuke Katahira, Kawasaki (JP)

(73) Assignee: Mitsubishi Heavy Industries, Ltd. (JP)

( * ) Notice: Subject to any disclaimer, the term of this patent is extended or adjusted under 35 U.S.C. 154(b) by 0 days.

(21) Appl. No.: 13/379,673

(22) PCT Filed: Dec. 24, 2009

(86) PCT No.: PCT/JP2009/071383
§ 371 (c)(1),
(2), (4) Date: Dec. 21, 2011

(87) PCT Pub. No.: WO2011/048711
PCT Pub. Date: Apr. 28, 2011

(65) Prior Publication Data
US 2012/0103227 A1    May 3, 2012

(30) Foreign Application Priority Data

Oct. 21, 2009 (JP) ................. 2009-242262

(51) Int. Cl.
*B61B 12/02* (2006.01)
(52) U.S. Cl. ............ 104/245; 104/242; 105/215.1
(58) Field of Classification Search ......... 104/242–247, 104/88.01, 130.01; 105/72.2, 215.1, 215.2
See application file for complete search history.

(56) References Cited

U.S. PATENT DOCUMENTS

| | | | |
|---|---|---|---|
| 4,223,611 A * | 9/1980 | Dawson et al. | 104/247 |
| 4,327,646 A * | 5/1982 | Nakata et al. | 104/89 |
| 6,477,963 B1 * | 11/2002 | Weule et al. | 104/243 |
| 7,644,664 B2 * | 1/2010 | Nakao et al. | 104/243 |
| 8,161,889 B2 * | 4/2012 | Morichika et al. | 105/72.2 |

(Continued)

FOREIGN PATENT DOCUMENTS

| | | |
|---|---|---|
| DE | 3400630 A1 | 2/1985 |
| JP | 51091413 U | 7/1976 |

(Continued)

OTHER PUBLICATIONS

International Search Report for PCT/JP2009/071383 date Mar. 23, 2010.

(Continued)

*Primary Examiner* — Jason C Smith
(74) *Attorney, Agent, or Firm* — Lowe Hauptman Ham & Berner, LLP

(57) ABSTRACT

In a guide rail type vehicle, a guide wheel includes a main guide wheel that rolls in contact with a main guide rail and a branch guide wheel that rolls in contact with a branch guide rail, a guide frame includes a guide arm that extends in a vehicle width direction and a guide link, the guide arm and the guide link are rotatably connected to each other via a first rotational shaft, the guide link includes a second rotational shaft in which the main guide wheel and the branch guide wheel are rotatably mounted to both ends, a buffer mechanism is provided between the guide arm and the guide link, and when the guide link rotates around the first rotational shaft with the guide wheel contacting with the guide rail, the buffer mechanism suppresses rotation of the guide link.

12 Claims, 10 Drawing Sheets

U.S. PATENT DOCUMENTS

| | | | |
|---|---|---|---|
| 8,234,022 B2* | 7/2012 | Morichika et al. | 701/19 |
| 2005/0076803 A1* | 4/2005 | Do | 104/243 |
| 2007/0113754 A1* | 5/2007 | Andreasson et al. | 104/242 |
| 2008/0083345 A1* | 4/2008 | Morita et al. | 104/106 |
| 2009/0259352 A1* | 10/2009 | Morichika et al. | 701/19 |
| 2009/0301342 A1* | 12/2009 | Morichika et al. | 104/243 |
| 2011/0114742 A1* | 5/2011 | Morichika et al. | 238/3 |
| 2012/0103227 A1* | 5/2012 | Maeyama et al. | 104/245 |

FOREIGN PATENT DOCUMENTS

| | | |
|---|---|---|
| JP | 60020454 U | 2/1985 |
| JP | 60020455 U | 2/1985 |
| JP | 61163054 A | 7/1986 |
| JP | 62018444 U | 2/1987 |
| JP | 1249567 A | 10/1989 |
| JP | 11278004 A | 10/1999 |
| JP | 2002274366 A | 9/2002 |
| JP | 2003146204 A | 5/2003 |
| JP | 3688461 B2 | 8/2005 |
| JP | 2007045321 A | 2/2007 |

OTHER PUBLICATIONS

International Preliminary Report on Patentability, dated May 24, 2012, in connection with PCT/JP2009/071383.

Office Action corresponding to JP 2009-242262, dated Sep. 7, 2012.

* cited by examiner

GUIDE RAIL TYPE VEHICLE WITH GUIDE DEVICE

RELATED APPLICATIONS

The present application is a National Phase of International Application Number PCT/JP2009/071383, filed Dec. 24, 2009 and claims priority from, Japanese Application Number 2009-242262, filed Oct. 21, 2009.

TECHNICAL FIELD

The present invention relates to a guide rail type vehicle that runs on a predetermined track. More particularly, it relates to a guide rail type vehicle with a guide device that guides the vehicle to run on a running track by bringing a guide wheel into abutment against a guide rail of the running track.

BACKGROUND ART

Recently, a guide rail type vehicle that runs on a track or a set route on a road surface or the like has been proposed. The vehicle is configured to run along a guide rail on the track by a guide device having a guide wheel (for example, see Patent Literature 1 and 2).

FIG. 17 shows one example of a guide device of a conventional guide rail type vehicle. As shown in FIG. 17, a truck (not shown) of the vehicle includes a lateral beam 71 that extends in the vehicle width direction, and an L-shaped guide arm 72 is rotatably mounted to a distal end portion of the lateral beam 71 via a pin 73. The L-shaped guide arm 72 is constituted by a first link 72a extending in the vehicle width direction, and a second link 72b extending in the vehicle front and rear direction. A guide wheel supporting member 74 extending in the vehicle front and rear direction is provided at an end portion of the first link 72a, and a main guide wheel 75 and a branch guide wheel 76 are rotatably mounted to the guide wheel supporting member 74 via a bearing. The second link 72b of the L-shaped guide arm 72 is also connected to the lateral beam 71 via a guide shaft 77.

As shown in FIG. 17, a cylindrical buffer rubber 78 is arranged between the second link 72b and the lateral beam 71. The cylindrical buffer rubber 78 is held between rubber seats 79. For example, when the main guide wheel 75 receives a force indicated by an arrow F from a guide rail (not shown), the L-shaped guide arm 72 rotates in the direction of an arrow X around the pin 73. At this point, the guide shaft 77 moves in the direction of an arrow Y, so that the buffer rubber 78 is compressed. A load applied to the lateral beam 71 when the main guide wheel 75 is in contact with the guide rail is thereby absorbed.

FIG. 18 shows another example of a guide device of a conventional guide rail type vehicle. As shown in FIG. 18, a reciprocation rod 82 extending outward in the vehicle width direction is mounted to an end portion 81a in the vehicle width direction of a guide arm 81 via a guide tube 83. A guide wheel bracket 84 is mounted to a distal end portion 82a of the reciprocation rod 82, and a guide wheel 85 is rotatably mounted to the guide wheel bracket 84.

As shown in FIG. 18, a guide portion 86 is also provided around the guide arm 81 at the distal end portion 81a of the guide arm 81. Guide rods 87 connected to the guide wheel bracket 84 are arranged within the guide portion 86. A buffer spring 88 is arranged around the guide rod 87. Accordingly, when the guide wheel 85 is in contact with a guide rail (not shown), the reciprocation rod 82 slides inward in the vehicle width direction along with the guide wheel bracket 84. At this point, the buffer spring 88 arranged around the guide rod 87 is compressed, thereby absorbing a load applied to the guide arm 81.

FIG. 19 shows yet another example of a guide device of a conventional guide rail type vehicle. As shown in FIG. 19, a truck (not shown) of the guide rail type vehicle includes a rectangular guide frame 91, and the guide frame 91 includes guide lateral beams 92 that extend in the vehicle width direction. Guide wheels 93 are rotatably mounted to both end portions of the vehicle width direction of the guide lateral beam 92. In the conventional example, the guide lateral beam 92 and the guide frame 91 are connected to each other by two links via a buffer rod 94. With the configuration, a load transmitted to the guide frame 91 from the guide lateral beam 92 when the guide wheel 93 is in contact with a guide rail 95 is absorbed by the buffer rod 94.

CITATION LIST

Patent Literature

Patent Literature 1: Japanese Patent No. 3688461
Patent Literature 2: Japanese Patent Laid-Open No. 61-163054

SUMMARY OF INVENTION

Technical Problem

In the above conventional example in FIG. 17, the load transmitted to the guide shaft 77 when the main guide wheel 75 is in contact with the guide rail is absorbed by the compression of the buffer rubber 78. However, the load is absorbed in the compression direction of the buffer rubber 78, which is a direction having higher rubber rigidity. Thus, there is a problem that the load transmitted to the guide shaft 77 cannot be sufficiently absorbed.

Furthermore, in the conventional example in FIG. 17, the guide wheel supporting member 74 is formed integrally with the L-shaped guide arm 72. Thus, the load applied to the guide wheel supporting member 74 is directly transmitted to the L-shaped guide arm 72 without being mitigated. That is, the conventional example in FIG. 17 has a problem that there is no structure to absorb the load between the guide wheel supporting member 74 and the L-shaped guide arm 72.

Also, in the above conventional example in FIG. 18, the reciprocation rod 82 and the guide rod 87 are held on one end. Thus, the reciprocation rod 82 and the guide rod 87 cannot fulfill their functions unless the sizes of the reciprocation rod 82 and the guide rod 87 are increased to improve the rigidity. Therefore, there is a problem that the guide device on the vehicle side increases in weight.

Furthermore, in the above conventional example in FIG. 19, the guide lateral beam 92 itself to which the load from the guide wheel 93 is transmitted has a large mass, and therefore has a high inertia from the weight. Thus, the buffer rod 94 itself that buffers the load applied to the guide frame 91 needs to be increased in size. Accordingly, there is a problem that the guide device on the vehicle side increases in weight.

The present invention has been made in view of such circumstances, and it is an object of the present invention to provide a guide rail type vehicle that can more absorb a load from a guide wheel as compared to the conventional cases while reducing the weight of a guide device on the vehicle side.

Solutions to Problems

To solve the problems in the conventional art, the present invention is a guide rail type vehicle with a guide device including a guide rail provided on both sides of a running track, and a guide wheel mounted to a guide frame on the vehicle side, the guide wheel rolling in contact with the guide rail to guide the vehicle, in which the guide wheel includes a main guide wheel that rolls in contact with a main guide rail of the guide rail provided along the running track and a branch guide wheel that rolls in contact with a branch guide rail of the guide rail provided at a branch position of the running track, the guide frame includes a guide arm that extends in a vehicle width direction and a guide link mounted to an end portion in the vehicle width direction of the guide arm, the guide arm and the guide link are rotatably connected to each other via a first rotational shaft, the guide link includes a second rotational shaft in which the main guide wheel and the branch guide wheel are rotatably mounted to both ends, a buffer mechanism is provided between the guide arm and the guide link, and when the guide link rotates around the first rotational shaft with the guide wheel contacting with the guide rail, the buffer mechanism suppresses rotation of the guide link.

Also, according to another aspect of the present invention, the buffer mechanism is arranged on an opposite side across the first rotational shaft from the guide wheel, and the buffer mechanism is an elastic member.

Also, according to another aspect of the present invention, the elastic member is arranged so as to be parallel to the first rotational shaft such that both ends thereof are mounted to the guide arm and the guide link, and the elastic member receives in a shear direction a load applied when the guide link rotates around the first rotational shaft.

Also, according to another aspect of the present invention, the buffer mechanism is arranged on an opposite side across the first rotational shaft from the guide wheel, the buffer mechanism includes a shaft member arranged between the guide arm and the guide link so as to be parallel to the first rotational shaft, a cylindrical receiving member arranged so as to surround the shaft member, and a cylindrical elastic member arranged between the shaft member and the cylindrical receiving member, and a plurality of slits are formed in the cylindrical elastic member in a direction planarly perpendicular to a direction of a load applied to the guide wheel, and are arranged symmetrically with respect to the shaft member.

Also, according to another aspect of the present invention, the guide arm includes a guide wheel receiver at an end portion on an outer side of the vehicle width direction, the guide link is rotatably mounted to the guide wheel receiver via the first rotational shaft, the buffer mechanism is arranged on an opposite side across the first rotational shaft from the guide wheel, and the buffer mechanism is a buffer spring that connects between an end portion of the guide link on the first rotational shaft side and the guide frame.

Also, according to another aspect of the present invention, the guide link and the buffer spring are axially coupled to each other via an elastic bush or a spherical bush, and the guide frame and the buffer spring are axially coupled to each other via an elastic bush or a spherical bush.

Also, according to another aspect of the present invention, the buffer mechanism includes a connection member that connects between an end portion of the guide link on an opposite side across the guide wheel from the first rotational shaft and the guide frame, and an elastic member arranged between the connection member and the guide frame.

Also, according to another aspect of the present invention, the elastic member is arranged so as to be parallel to the first rotational shaft such that both ends thereof are mounted to the connection member and the guide frame, and the elastic member receives in a shear direction a load applied when the guide link rotates around the first rotational shaft.

Also, according to another aspect of the present invention, the buffer mechanism includes a connection member that connects between an end portion of the guide link on an opposite side across the guide wheel from the first rotational shaft and the guide frame, a shaft member arranged between the connection member and the guide frame so as to be parallel to the first rotational shaft, a cylindrical receiving member arranged so as to surround the shaft member, and a cylindrical elastic member arranged between the shaft member and the cylindrical receiving member, and a plurality of slits are formed in the cylindrical elastic member in a direction planarly perpendicular to a direction of a load applied to the guide wheel, and are arranged symmetrically with respect to the shaft member.

Also, according to another aspect of the present invention, a plurality of grooves extending in a vertical direction are formed parallel to each other in the vehicle width direction in an outer surface of the end portion of the guide link on the connection member side, a plurality of groove receiving portions extending in the vertical direction are formed parallel to each other in the vehicle width direction in an outer surface of an end portion of the connection member on the guide link side, and the guide link and the connection member are connected to each other with the grooves and the groove receiving portions being engaged with each other.

Also, according to another aspect of the present invention, the buffer mechanism is arranged on an opposite side across the guide wheel from the first rotational shaft, the buffer mechanism is a plate-like elastic member that connects between an end portion of the guide link on an opposite side from an end portion on the first rotational shaft side and the guide frame, and the plate-like elastic member is formed in a crank shape from the guide link to the guide frame, and is arranged such that a width direction thereof is aligned with a vertical direction.

Also, according to another aspect of the present invention, a plurality of grooves extending in the vertical direction are formed parallel to each other in the vehicle width direction in an outer surface of the end portion of the guide link on the elastic member side, a plurality of groove receiving portions extending in the vertical direction are formed parallel to each other in the vehicle width direction in an outer surface of an end portion of the plate-like elastic member on the guide link side, and the guide link and the plate-like elastic member are connected to each other with the grooves and the groove receiving portions being engaged with each other.

Advantageous Effects of Invention

The guide rail type vehicle according to the present invention has the guide device including a guide rail provided on both sides of a running track, and a guide wheel mounted to a guide frame on the vehicle side, the guide wheel rolling in contact with the guide rail to guide the vehicle. In the guide rail type vehicle, the guide wheel includes a main guide wheel that rolls in contact with a main guide rail of the guide rail provided along the running track and a branch guide wheel that rolls in contact with a branch guide rail of the guide rail provided at a branch position of the running track, the guide frame includes a guide arm that extends in a vehicle width direction and a guide link mounted to an end portion in the vehicle width direction of the guide arm, the guide arm and the guide link are rotatably connected to each other via a first rotational shaft, the guide link includes a second rotational shaft in which the main guide wheel and the branch guide wheel are rotatably mounted to both ends, a buffer mechanism is provided between the guide arm and the guide link, and when the guide link rotates around the first rotational shaft with the guide wheel contacting with the guide rail, the buffer mechanism suppresses rotation of the guide link.

With this configuration, the guide arm and the guide link are separated from each other, and the buffer mechanism is provided between the guide arm and the guide link unlike in the conventional cases. Thus, a load from the guide wheel can be absorbed between the guide arm and the guide link, so that a load or a vibration transmitted to the guide frame can be further mitigated. As a result, the vehicle gives a passenger a more comfortable ride than that in the conventional cases. Moreover, since the load or the vibration on a truck of the vehicle can be mitigated, each component of the truck is less worn or damaged, so that less maintenance work is required on the vehicle.

Furthermore, due to the simple structure that the guide arm and the guide link are separated from each other and the buffer mechanism is provided therebetween, the weight of the guide device on the vehicle side can be reduced. Accordingly, there is a less adverse effect of inertia from the weight of the guide device on the vehicle side, and the movement of each component of the guide device such as the rotation is smoothly performed, so that the load absorption effect of the buffer mechanism can be further improved.

Also, in the guide rail type vehicle according to the present invention, the buffer mechanism is arranged on an opposite side across the first rotational shaft from the guide wheel, and the buffer mechanism is an elastic member. Thus, when the guide link rotates around the first rotational shaft with the guide wheel contacting with the guide rail, the elastic member is elastically deformed, to thereby suppress the rotation of the guide link. Also, due to the simple structure that the elastic member is provided between the guide arm and the guide link, the weight of the guide device on the vehicle side can be further reduced.

Also, in the guide rail type vehicle according to the present invention, the elastic member is arranged so as to be parallel to the first rotational shaft such that both ends thereof are mounted to the guide arm and the guide link, and the elastic member receives in a shear direction a load applied when the guide link rotates around the first rotational shaft. Thus, when the guide link rotates around the first rotational shaft with the guide wheel contacting with the guide rail, the elastic member is shear-deformed, to thereby suppress the rotation of the guide link. In particular, while the load is absorbed in the compression direction of the elastic member in the conventional case, the load is received in the shear direction in which the elastic member is more flexibly deformed in the above configuration. Thus, the load from the guide wheel can be more absorbed as compared to the conventional case.

Also, in the guide rail type vehicle according to the present invention, the buffer mechanism is arranged on an opposite side across the first rotational shaft from the guide wheel, the buffer mechanism includes a shaft member arranged between the guide arm and the guide link so as to be parallel to the first rotational shaft, a cylindrical receiving member arranged so as to surround the shaft member, and a cylindrical elastic member arranged between the shaft member and the cylindrical receiving member, and a plurality of slits are formed in the cylindrical elastic member in a direction planarly perpendicular to a direction of a load applied to the guide wheel, and are arranged symmetrically with respect to the shaft member. Thus, when the guide link rotates around the first rotational shaft with the guide wheel contacting with the guide rail, the shaft member is displaced toward the slit, to thereby shear-deform the cylindrical elastic member. While the load is absorbed in the compression direction of the elastic member in the conventional case, the load is received in the shear direction in which the elastic member is more flexibly deformed in the present invention. Thus, the load from the guide wheel can be more absorbed as compared to the conventional case.

Also, when the shaft member is displaced within the cylindrical receiving member, the rigidity of the cylindrical elastic member is increased at a point in which the slit is squashed, so that the displacement of the shaft member is restricted. Accordingly, with the configuration, the excessive rotation of the guide link can be restricted without separately providing a stopper.

Also, in the guide rail type vehicle according to the present invention, the guide arm includes a guide wheel receiver at an end portion on an outer side of the vehicle width direction, the guide link is rotatably mounted to the guide wheel receiver via the first rotational shaft, the buffer mechanism is arranged on an opposite side across the first rotational shaft from the guide wheel, and the buffer mechanism is a buffer spring that connects between an end portion of the guide link on the first rotational shaft side and the guide frame. Thus, the rotation of the guide link can be suppressed by the elastic force of the buffer spring in the compression or tension direction when the guide link rotates around the first rotational shaft with the guide wheel contacting with the guide rail.

Also, in the guide rail type vehicle according to the present invention, the guide link and the buffer spring are axially coupled to each other via an elastic bush, and the guide frame and the buffer spring are axially coupled to each other via an elastic bush. Thus, since the buffer spring can also absorb the load at both ends, the load from the guide wheel can be further absorbed.

Also, in the guide rail type vehicle according to the present invention, the buffer mechanism includes a connection member that connects between an end portion of the guide link on an opposite side across the guide wheel from the first rotational shaft and the guide frame, and an elastic member arranged between the connection member and the guide frame. Thus, when the guide link rotates around the first rotational shaft with the guide wheel contacting with the guide rail, the elastic member is elastically deformed, to thereby suppress the rotation of the guide link. Moreover, the guide wheel is supported on both ends by the guide arm and the connection member. Thus, when the guide link rotates around the first rotational shaft with the guide wheel contacting with the guide rail, the load is not concentrated around the first rotational shaft, and uneven wear on a bush or the like supporting the first rotational shaft can be further reduced. Accordingly, less maintenance work is required on the vehicle.

Also, in the guide rail type vehicle according to the present invention, the elastic member is arranged so as to be parallel to the first rotational shaft such that both ends thereof are mounted to the connection member and the guide frame, and the elastic member receives in a shear direction a load applied when the guide link rotates around the first rotational shaft. Thus, when the guide link rotates around the first rotational shaft with the guide wheel contacting with the guide rail, the elastic member is shear-deformed, to thereby suppress the rotation of the guide link. In particular, while the load is absorbed in the compression direction of the elastic member in the conventional case, the load is received in the shear direction in which the elastic member is more flexibly deformed in the above configuration. Thus, the load from the guide wheel can be more absorbed as compared to the conventional case.

Also, in the guide rail type vehicle according to the present invention, the buffer mechanism includes a connection member that connects between an end portion of the guide link on an opposite side across the guide wheel from the first rotational shaft and the guide frame, a shaft member arranged between the connection member and the guide frame so as to be parallel to the first rotational shaft, a cylindrical receiving member arranged so as to surround the shaft member, and a cylindrical elastic member arranged between the shaft member and the cylindrical receiving member, and a plurality of slits are formed in the cylindrical elastic member in a direction planarly perpendicular to a direction of a load applied to the guide wheel, and are arranged symmetrically with respect to the shaft member. Thus, when the guide link rotates around the first rotational shaft with the guide wheel contacting with the guide rail, the shaft member is displaced toward the slit, to thereby shear-deform the cylindrical elastic member. While the load is absorbed in the compression direction of the elastic member in the conventional case, the load is received in the shear direction in which the elastic member is more flexibly deformed in the present invention. Thus, the load from the guide wheel can be more absorbed as compared to the conventional case. Also, when the shaft member is displaced within the cylindrical receiving member, the rigidity of the cylindrical elastic member is increased at a point in which the slit is squashed, so that the displacement of the shaft member is restricted. Accordingly, with the configuration, the excessive rotation of the guide link can be restricted without separately providing a stopper.

Moreover, the guide wheel is supported on both ends by the guide arm and the connection member. Thus, when the guide link rotates around the first rotational shaft with the guide wheel contacting with the guide rail, the load is not concentrated around the first rotational shaft, and uneven wear on the bush or the like supporting the first rotational shaft can be further reduced. Accordingly, less maintenance work is required on the vehicle.

Also, in the guide rail type vehicle according to the present invention, a plurality of grooves extending in a vertical direction are formed parallel to each other in the vehicle width direction in an outer surface of the end portion of the guide link on the connection member side, a plurality of groove receiving portions extending in the vertical direction are formed parallel to each other in the vehicle width direction in an outer surface of an end portion of the connection member on the guide link side, and the guide link and the connection member are connected to each other with the grooves and the groove receiving portions being engaged with each other. Thus, the engagement position between the groove and the groove receiving portion can be adjusted in the vehicle width direction, and the outer width of the guide wheel can be thereby adjusted. Moreover, the outer width of the guide wheel can be adjusted only by shifting the engagement position between the groove and the groove receiving portion one by one. Therefore, the outer width of the guide wheel can be adjusted on a fine scale and in a simple manner.

Also, since the outer width of the guide wheel can be adjusted, the respective components of the guide device can be manufactured at lower processing accuracy. As a result, the cost of manufacturing the vehicle can be reduced.

Also, in the guide rail type vehicle according to the present invention, the buffer mechanism is arranged on an opposite side across the guide wheel from the first rotational shaft, the buffer mechanism is a plate-like elastic member that connects between an end portion of the guide link on an opposite side from an end portion on the first rotational shaft side and the guide frame, and the plate-like elastic member is formed in a crank shape from the guide link to the guide frame, and is arranged such that a width direction thereof is aligned with a vertical direction. Thus, the rotation of the guide link can be suppressed by the flexibility of the plate-like elastic member when the guide link rotates around the first rotational shaft with the guide wheel contacting with the guide rail.

Moreover, the guide wheel is supported on both ends by the guide arm and the plate-like elastic member. Thus, when the guide link rotates around the first rotational shaft with the guide wheel contacting with the guide rail, the load is not concentrated around the first rotational shaft, and uneven wear on the bush or the like supporting the first rotational shaft can be further reduced. Accordingly, less maintenance work is required on the vehicle.

Also, the plate-like elastic member is a member which is not worn nor changed with time. Thus, the plate-like elastic member is replaced less frequently as compared to another component on which wear could occur. Accordingly, less maintenance work is required on the vehicle.

Also, in the guide rail type vehicle according to the present invention, a plurality of grooves extending in the vertical direction are formed parallel to each other in the vehicle width direction in an outer surface of the end portion of the guide link on the elastic member side, a plurality of groove receiving portions extending in the vertical direction are formed parallel to each other in the vehicle width direction in an outer surface of an end portion of the plate-like elastic member on the guide link side, and the guide link and the plate-like elastic member are connected to each other with the grooves and the groove receiving portions being engaged with each other. Thus, the engagement position between the groove and the groove receiving portion can be adjusted in the vehicle width direction, and the outer width of the guide wheel can be thereby adjusted. Moreover, the outer width of the guide wheel can be adjusted only by shifting the engagement position between the groove and the groove receiving portion one by one. Therefore, the outer width of the guide wheel can be adjusted on a fine scale and in a simple manner.

Also, since the outer width of the guide wheel can be adjusted, the respective components of the guide device can be manufactured at lower processing accuracy. As a result, the cost of manufacturing the vehicle can be reduced.

DESCRIPTION OF EMBODIMENTS

First Embodiment

Figure 1:
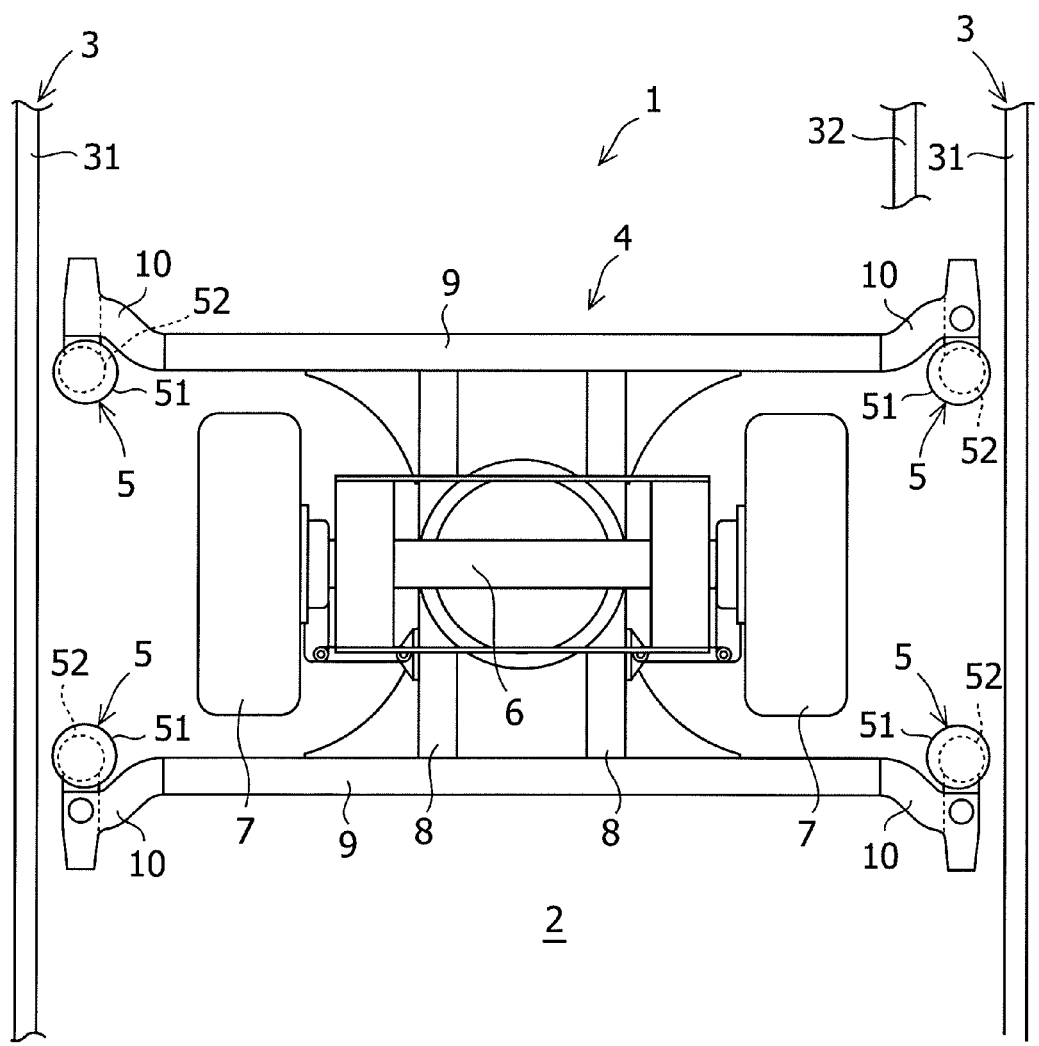
FIG. 1 is a plan view of a truck of a guide rail type vehicle according to a first embodiment of the present invention.
Figure 2:
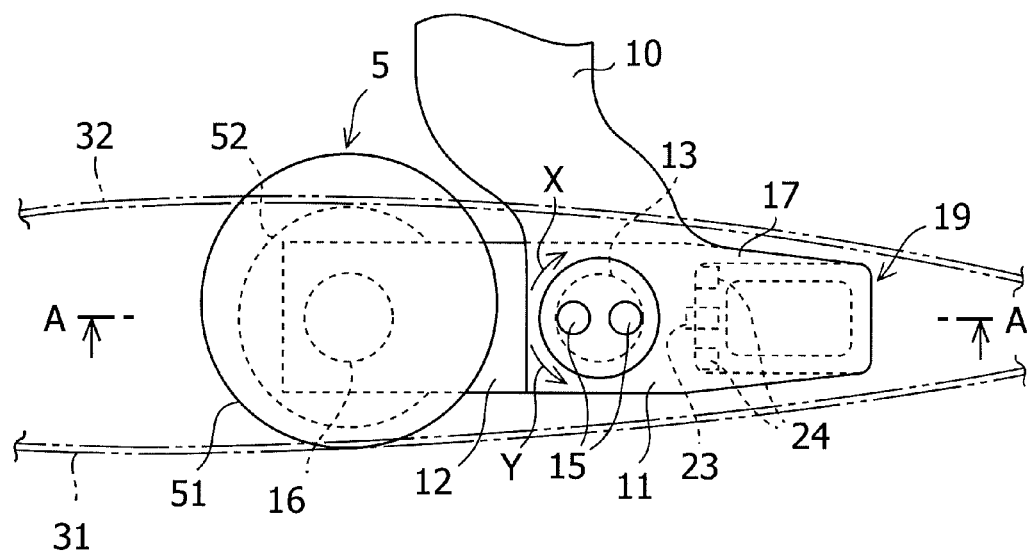
FIG. 2 is a plan view of a guide device of the guide rail type vehicle according to the first embodiment of the present invention.
Figure 3:
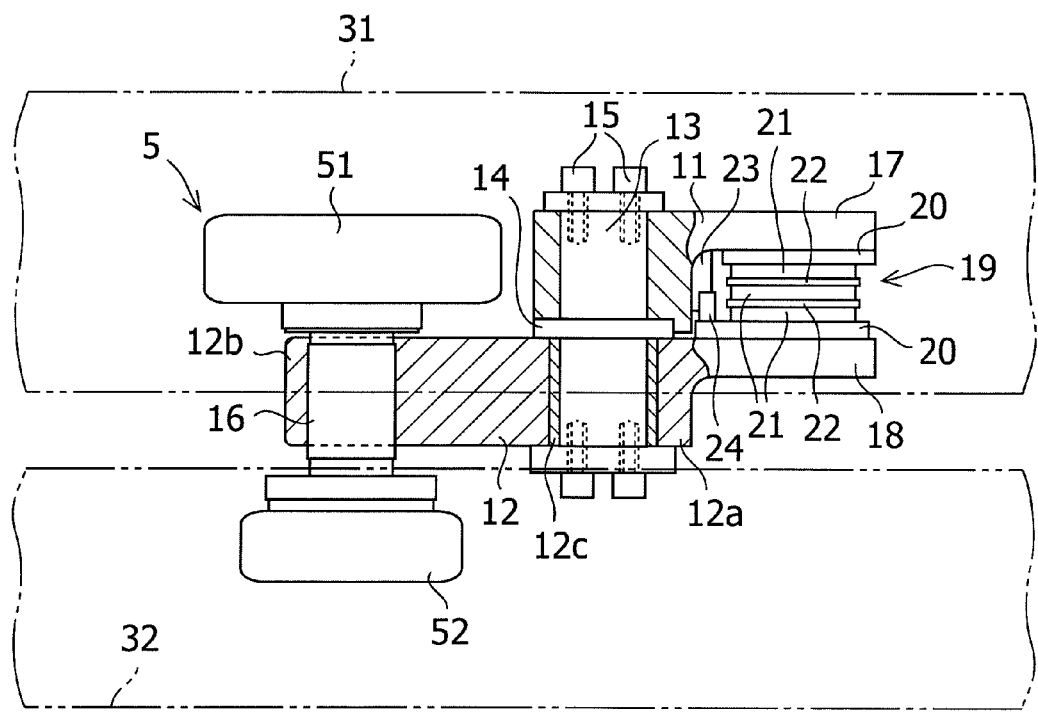
FIG. 3 is a sectional view taken along a line A-A in FIG. 2.

In the following, a guide rail type vehicle according to a first embodiment of the present invention will be described with reference to the drawings. FIG. 1 is a plan view of a truck of the guide rail type vehicle according to the first embodiment of the present invention. FIG. 2 is a plan view of a guide device of the guide rail type vehicle according to the first embodiment of the present invention. Also, FIG. 3 is a sectional view taken along a line A-A in FIG. 2.

As shown in FIG. 1, the guide rail type vehicle according to the first embodiment includes a truck 1 at each of front and rear portions (the rear portion is not shown) in the vehicle front and rear direction, and runs on a predetermined running track 2.

As shown in FIG. 1, the guide device of the vehicle according to the first embodiment includes guide rails 3 respectively provided along the running track 2 as a vehicle route on both the right and left sides thereof, and guide wheels 5 mounted to a guide frame 4 of the truck 1. Therefore, the guide wheels 5 constituting the guide device roll in contact with the guide rails 3, so that the vehicle runs while being guided along the running track 2.

Two types of rails, a main guide rail 31 and a branch guide rail 32 provided in association with each other on the running track 2 constitute the guide rail 3. The main guide rail 31 is formed of H-shaped steel having rigidity, for example, and provided on both the right and left sides on the track surface of the running track 2. Also, the branch guide rail 32 is provided at a branch position that is located in a portion of the running track 2 to guide the vehicle to another running track, and erected on the track surface below and inward from the main guide rail 31.

Also, the guide wheel 5 is constituted by a main guide wheel 51 and a branch guide wheel 52. When the vehicle runs on the running track 2, the main guide wheel 51 is in contact with the main guide rail 31, and the branch guide wheel 52 is in contact with the branch guide rail 32.

As shown in FIG. 1, the truck 1 of the vehicle includes an axle 6 extending in the vehicle width direction, and a pair of running wheels 7 are mounted to both end portions in the vehicle width direction of the axle 6 in a steerable manner. Also, the guide frame 4 of the truck 1 is constituted by two longitudinal beams 8 extending in the vehicle front and rear direction, and two lateral beams 9 connecting the longitudinal beams 8 at both end portions of the vehicle front and rear direction. The lateral beam 9 includes guide arms 10 extending in the vehicle width direction provided at both end portions of the vehicle width direction of the lateral beam 9. In addition, as shown in FIG. 2, a guide wheel receiver 11 is also provided at an end portion on the outer side of the vehicle width direction of the guide arm 10.

As shown in FIGS. 2 and 3, a guide link 12 extending in the vehicle front and rear direction is mounted to the guide wheel receiver 11. One end 12a of the guide link 12 and the guide wheel receiver 11 are rotatably connected to each other via a first rotational shaft 13 while sandwiching a flange 14 of the rotational shaft 13 therebetween.

Also, as shown in FIG. 3, the first rotational shaft 13 supports the guide link 12 via a bush 12c. The first rotational shaft 13 is mounted to the guide wheel receiver 11 by fastening members 15 such as bolts via washers. Meanwhile, a second rotational shaft 16 is rotatably mounted to the other end 12b of the guide link 12, and the main guide wheel 51 and the branch guide wheel 52 are rotatably mounted to both upper and lower end portions of the second rotational shaft 16.

As shown in FIG. 3, in the first embodiment, a first support portion 17 is provided at the guide wheel receiver 11 so as to extend in the opposite direction across the first rotational shaft 13 from the guide wheel 5. Meanwhile, a second support portion 18 is provided at the guide link 12 so as to extend in the same direction as the first support portion 17. The first support portion 17 of the guide wheel receiver 11 and the second support portion 18 of the guide link 12 are arranged so as to be parallel to each other.

As shown in FIG. 3, a buffer mechanism 19 is provided between the first support portion 17 of the guide wheel receiver 11 and the second support portion 18 of the guide link 12. The buffer mechanism 19 is arranged between the first support portion 17 and the second support portion 18 via upper and lower seat plates 20 so as to be parallel to the first rotational shaft 13.

As shown in FIG. 3, the buffer mechanism 19 includes a plurality of rectangular buffer rubbers 21 and a plurality of rectangular metal plates 22. The buffer rubbers 21 and the metal plates 22 are alternately layered with their planar portions being horizontally arranged. The buffer rubbers 21 and the metal plates 22 are fixed to each other with an adhesive. With this configuration, the buffer rubbers 21 of the buffer mechanism 19 receive in the shear direction a load applied between the first support portion 17 and the second support portion 18 when the guide link 12 rotates around the first rotational shaft 13.

As shown in FIGS. 2 and 3, a stopper 23 is also provided at the guide wheel receiver 11 so as to project in the same direction as the first support portion 17. Meanwhile, a pair of stopper receivers 24 are provided on the seat plate 20 on the second support portion 18 side of the guide link 12 so as to be arranged with a gap from the stopper 23 in the vehicle width direction.

Next, a method of determining the size of the buffer mechanism 19 will be described.

FIG. 2 shows a position in which the running track 2 is curved toward an upper portion in the drawing. In FIG. 2, the main guide rail 31 erected on the outer side of the curve is shown to be translated, and the branch guide rail 32 erected on the inner side of the curve is shown to be translated. The main guide rail 31 and the branch guide rail 32 are shown for explaining the method of determining the size of the buffer mechanism 19. In the embodiment, the size of the buffer mechanism 19 needs to be determined such that the buffer mechanism 19 is fitted between the main guide rail 31 and the branch guide rail 32 so as not to contact with the main guide rail 31 and the branch guide rail 32 in the curve.

With the above configuration, in the first embodiment, when the main guide wheel 51 receives a force from outside of the vehicle width direction upon contacting with the main guide rail 31, the guide link 12 rotates in the direction of an arrow X around the first rotational shaft 13. At this point, the buffer rubbers 21 of the buffer mechanism 19 are shear-deformed, to thereby suppress the rotation of the guide link 12.

Meanwhile, when the branch guide wheel 52 receives a force from inside of the vehicle width direction upon contacting with the branch guide rail 32, the guide link 12 rotates in the direction of an arrow Y around the first rotational shaft 13. At this point, the buffer rubbers 21 of the buffer mechanism 19 are similarly shear-deformed, to thereby suppress the rotation of the guide link 12.

Also, in the first embodiment, when the guide link 12 rotates in the directions of the arrows X and Y around the first rotational shaft 13, the stopper 23 of the guide wheel receiver 11 is brought into contact with the stopper receivers 24, to thereby restrict the rotational range of the guide link 12.

The guide rail type vehicle according to the first embodiment is the vehicle with the guide device including the guide rail 3 provided on both sides of the running track, and the guide wheel 5 mounted to the guide frame 4 on the truck 1 side of the vehicle, the guide wheel 5 rolling in contact with the guide rail 3 to guide the vehicle, in which the guide wheel 5 includes the main guide wheel 51 that rolls in contact with the main guide rail 31 of the guide rail provided along the running track 2 and the branch guide wheel 52 that rolls in contact with the branch guide rail 32 of the guide rail 3 provided at the branch position of the running track 2, the guide frame 4 includes the guide arm 10 that extends in the vehicle width direction and the guide link 12 provided at the guide wheel receiver 11 on both sides of the vehicle width direction of the guide arm 10, the guide wheel receiver 11 and the guide link 12 are rotatably connected to each other via the first rotational shaft 13, the guide link 12 includes the second rotational shaft 16 in which the main guide wheel 51 and the branch guide wheel 52 are rotatably mounted to both ends of the second rotational shaft 16, the buffer mechanism 19 is provided between the guide wheel receiver 11 and the guide link 12, and when the guide link 12 rotates around the first rotational shaft 13 with the guide wheel 5 contacting with the guide rail 3, the buffer mechanism 19 is configured to suppress the rotation of the guide link 12.

With this configuration, the guide arm 10 and the guide link 12 are separated from each other, and the buffer mechanism 19 is provided between the guide arm 10 and the guide link 12 unlike in the conventional cases. Thus, a load from the guide wheel 5 can be absorbed between the guide arm 10 and the guide link 12, so that a load or a vibration transmitted to the guide frame 4 can be further mitigated. As a result, the vehicle gives a passenger a more comfortable ride than that in the conventional cases. In addition, since the load or the vibration on the truck 1 of the vehicle can be mitigated, each component of the truck 1 is less worn or damaged, so that less maintenance work is required on the vehicle.

Furthermore, due to the simple structure that the guide arm 10 and the guide link 12 are separated from each other and the buffer mechanism 19 is provided therebetween, the weight of the guide device on the vehicle side can be reduced. Accordingly, there is a less adverse effect of inertia from the weight of the guide device on the vehicle side, and the movement of each component of the guide device such as the rotation is smoothly performed, so that the load absorption effect of the buffer mechanism 19 can be further improved.

Also, in the first embodiment, the buffer mechanism 19 includes the plurality of rectangular buffer rubbers 21 and the plurality of rectangular metal plates 22, and the buffer rubbers 21 of the buffer mechanism 19 receive in the shear direction the load applied between the first support portion 17 and the second support portion 18 when the guide link 12 rotates around the first rotational shaft 13. Thus, when the guide link 12 rotates around the first rotational shaft 13 with the guide wheel 5 contacting with the guide rail 3, the buffer rubbers 21 are shear-deformed, to thereby suppress the rotation of the guide link 12. In particular, while the load is absorbed in the compression direction of the elastic member in the conventional case, the above embodiment is configured such that the load is received in the shear direction in which the buffer rubbers 21 are more flexibly deformed. Therefore, the load from the guide wheel 5 can be more absorbed as compared to the conventional case.

Also, in the first embodiment, the stopper 23 is provided at the guide wheel receiver 11 so as to project in the same direction as the first support portion 17, and the pair of stopper receivers 24 are provided on the seat plate 20 on the second support portion 18 side of the guide link 12 so as to be arranged with the gap from the stopper 23 in the vehicle width direction. Thus, when the guide link 12 rotates in the directions of the arrows X and Y around the first rotational shaft 13, the stopper 23 of the guide wheel receiver 11 is brought into contact with the stopper receivers 24, to thereby restrict the rotational range of the guide link 12.

Second Embodiment

Figure 4:
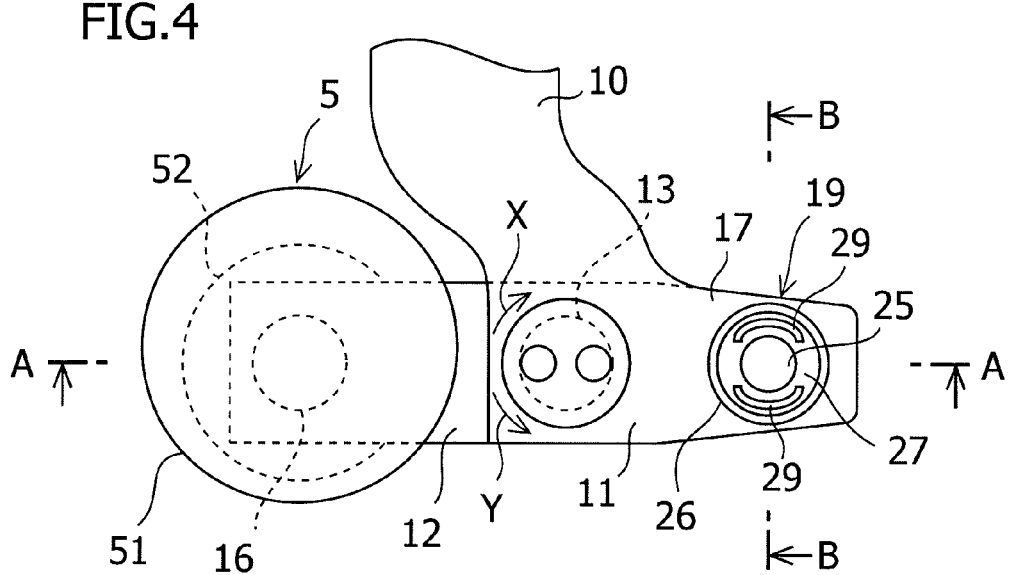
FIG. 4 is a plan view of a guide device of a guide rail type vehicle according to a second embodiment of the present invention.
Figure 5:
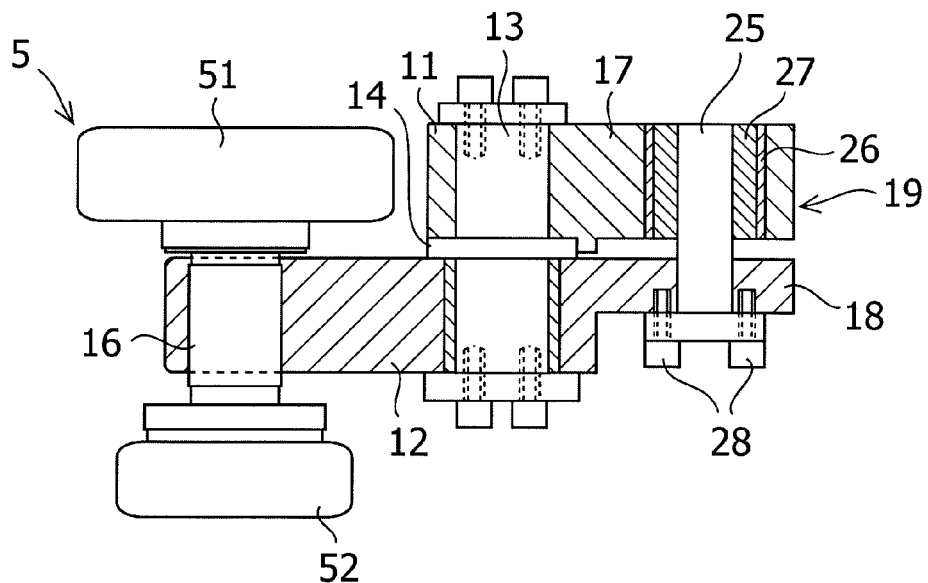
FIG. 5 is a sectional view taken along a line A-A in FIG. 4.
Figure 6:
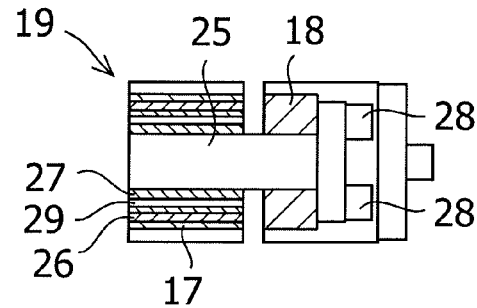
FIG. 6 is a sectional view taken along a line B-B in FIG. 4.

In the following, a guide rail type vehicle according to a second embodiment of the present invention will be described by reference to the drawings. FIG. 4 is a plan view of a guide device of the guide rail type vehicle according to the second embodiment of the present invention. FIG. 5 is a sectional view taken along a line A-A in FIG. 4. FIG. 6 is a sectional view taken along a line B-B in FIG. 4. The same portions as those described in the aforementioned embodiment are assigned the same reference numerals to omit repeated description.

As shown in FIGS. 4 and 5, in the second embodiment, the buffer mechanism 19 includes a shaft member 25 arranged between the first support portion 17 of the guide wheel receiver 11 and the second support portion 18 of the guide link 12 so as to be parallel to the first rotational shaft 13, a cylindrical receiving member 26 arranged so as to surround the shaft member 25, and a cylindrical buffer rubber 27 arranged between the shaft member 25 and the cylindrical receiving member 26.

As shown in FIGS. 5 and 6, the shaft member 25 is fixed to the second support portion 18 of the guide link 12 by fastening members 28 such as bolts. Meanwhile, the cylindrical receiving member 26 is mounted to the first support portion 17 of the guide wheel receiver 11, and the cylindrical buffer rubber 27 is arranged between the shaft member 25 and the cylindrical receiving member 26 at the first support portion 17 of the guide wheel receiver 11.

Also, as shown in FIG. 4, a plurality of slits 29 are formed in the cylindrical buffer rubber 27 in the direction planarly perpendicular to the direction of the load applied to the guide wheel 5. The plurality of slits 29 are formed symmetrically with respect to the shaft member 25. That is, the cylindrical buffer rubber 27 of the buffer mechanism 19 can be elastically deformed within the cylindrical receiving member 26 by providing the slits 29. With the configuration, the cylindrical buffer rubber 27 of the buffer mechanism 19 is elastically deformed to absorb the load applied to the shaft member 25 when the guide link 12 rotates around the first rotational shaft 13.

Accordingly, in the second embodiment, when the main guide wheel 51 receives the force from outside of the vehicle width direction upon contacting with the main guide rail 31, the guide link 12 rotates in the direction of the arrow X around the first rotational shaft 13. At this point, the cylindrical buffer rubber 27 of the buffer mechanism 19 is shear-deformed, to thereby suppress the rotation of the guide link 12.

Meanwhile, when the branch guide wheel 52 receives the force from inside of the vehicle width direction upon contacting with the branch guide rail 32, the guide link 12 rotates in the direction of the arrow Y around the first rotational shaft 13. At this point, the cylindrical buffer rubber 27 of the buffer mechanism 19 is similarly shear-deformed, to thereby suppress the rotation of the guide link 12.

In the second embodiment, the buffer mechanism 19 includes the shaft member 25 arranged between the first support portion 17 of the guide wheel receiver 11 and the second support portion 18 of the guide link 12 so as to be parallel to the first rotational shaft 13, the cylindrical receiving member 26 arranged so as to surround the shaft member 25, and the cylindrical buffer rubber 27 arranged between the shaft member 25 and the cylindrical receiving member 26. The plurality of slits 29 are formed in the cylindrical buffer rubber 27 in the direction planarly perpendicular to the direction of the load applied to the guide wheel 5, and are arranged symmetrically with respect to the shaft member 25. Thus, when the guide link 12 rotates around the first rotational shaft 13 with the guide wheel 5 contacting with the guide rail 3, the shaft member 25 is displaced toward the slit 29, to thereby shear-deform the cylindrical buffer rubber 27. While the load is absorbed in the compression direction of the elastic member in the conventional case, the above embodiment is configured such that the load is received in the shear direction in which the elastic member is more flexibly deformed. Thus, the load from the guide wheel 5 can be more absorbed as compared to the conventional case.

Also, when the shaft member 25 is displaced within the cylindrical receiving member 26, the rigidity of the cylindrical buffer rubber 27 is increased at a point in which the slit 29 is squashed, so that the displacement of the shaft member 25 is restricted. Accordingly, with the configuration, the excessive rotation of the guide link 12 can be restricted without separately providing a stopper.

Third Embodiment

Figure 7:
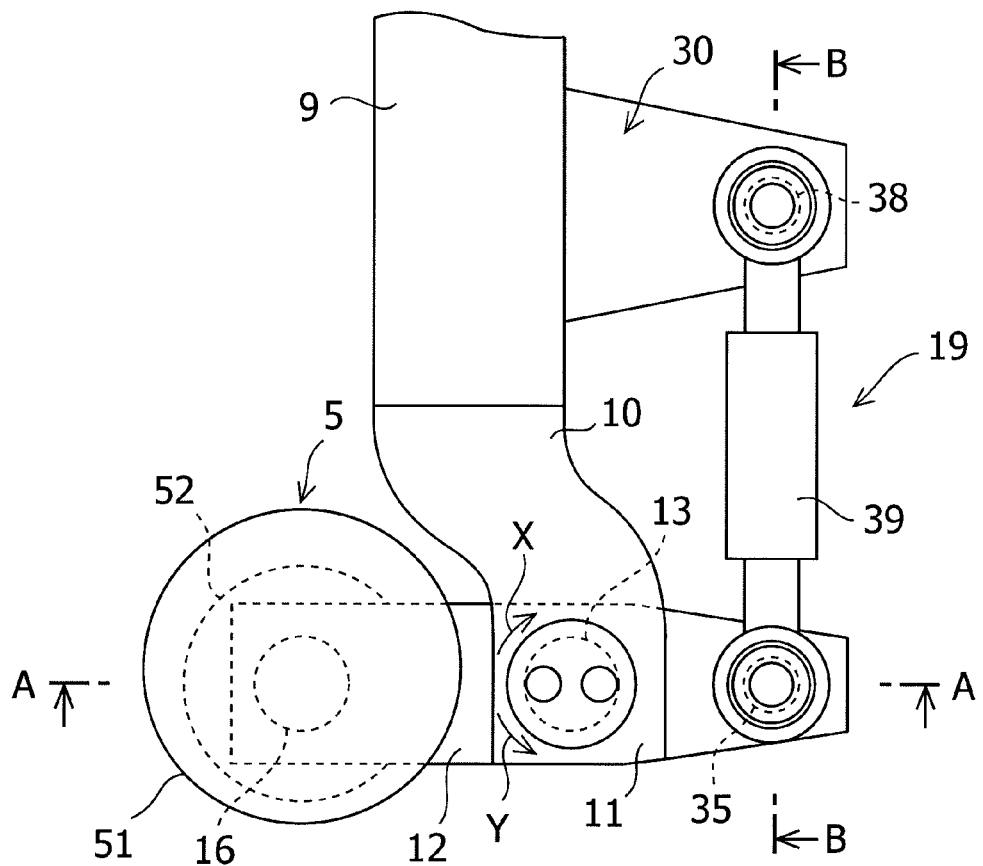
FIG. 7 is a plan view of a guide device of a guide rail type vehicle according to a third embodiment of the present invention.
Figure 8:
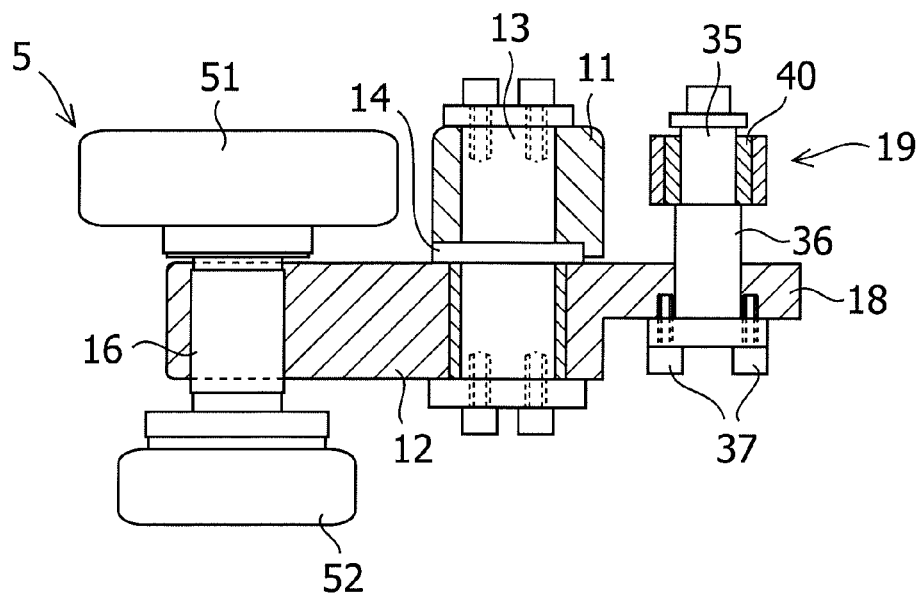
FIG. 8 is a sectional view taken along a line A-A in FIG. 7.
Figure 9:
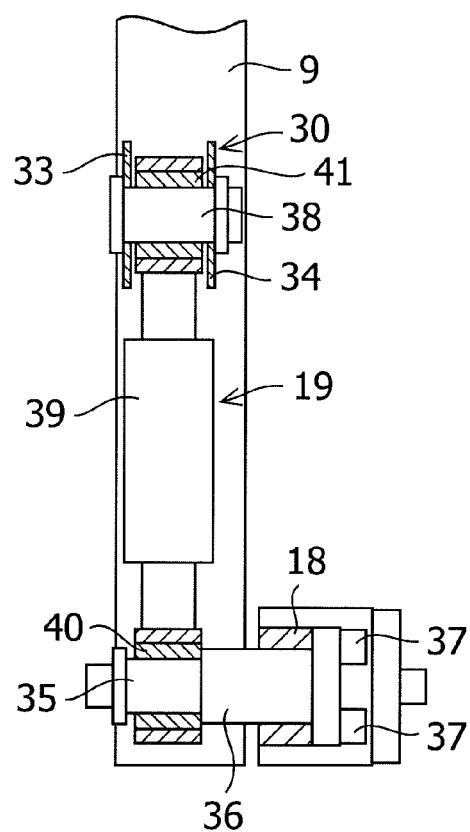
FIG. 9 is a sectional view taken along a line B-B in FIG. 7.

In the following, a guide rail type vehicle according to a third embodiment of the present invention will be described by reference to the drawings. FIG. 7 is a plan view of a guide device of the guide rail type vehicle according to the third embodiment of the present invention. FIG. 8 is a sectional view taken along a line A-A in FIG. 7. FIG. 9 is a sectional view taken along a line B-B in FIG. 7. The same portions as those described in the aforementioned embodiments are assigned the same reference numerals to omit repeates description.

As shown in FIG. 7, in the third embodiment, the buffer mechanism 19 is arranged on the opposite side across the first rotational shaft 13 from the guide wheel 5.

As shown in FIGS. 7 and 9, a buffer mechanism receiving portion 30 is provided at the lateral beam 9 so as to extend in the same direction as the second support portion 18 of the guide link 12. The buffer mechanism receiving portion 30 includes an upper plate-like member 33 and a lower plate-like member 34. The upper and lower plate-like members 33 and 34 are arranged parallel to each other at an interval.

As shown in FIGS. 8 and 9, a first shaft-like member 35 extending in the vertical direction is mounted to the second support portion 18 of the guide link 12 via a support member 36. The support member 36 is fixed to the second support portion 18 by fastening members 37 such as bolts. The buffer mechanism receiving portion 30 also includes a second shaft-like member 38 of which one end is supported by the upper plate-like member 33 and of which other end is supported by the lower plate-like member 34. The first shaft-like member 35 of the second support portion 18 and the second shaft-like member 38 of the buffer mechanism receiving portion 30 are connected to each other via a buffer rod (a buffer spring) 39. The buffer rod has a spring and damper function by including an elastic member such as a spring.

Also, as shown in FIGS. 8 and 9, in the third embodiment, the first shaft-like member 35 of the second support portion 18 and the buffer rod 39 are axially coupled to each other via a first elastic bush (or a spherical bush) 40 such as a rubber bush. The second shaft-like member 38 of the buffer mechanism receiving portion 30 and the buffer rod 39 are also axially coupled to each other via a second elastic bush (or a spherical bush) 41 such as a rubber bush. Also, a turnbuckle (not shown) is provided in a coupling portion between the buffer rod 39 and the respective shaft-like members 35 and 38, so that the length of the buffer rod 39 in the vehicle width direction can be adjusted.

Accordingly, in the third embodiment, when the main guide wheel 51 receives the force from outside of the vehicle width direction upon contacting with the main guide rail 31, the guide link 12 rotates in the direction of the arrow X around the first rotational shaft 13. At this point, the rotation of the guide link 12 is suppressed by the elastic force of the buffer rod 39 in the compression direction.

Meanwhile, when the branch guide wheel 52 receives the force from inside of the vehicle width direction upon contacting with the branch guide rail 32, the guide link 12 rotates in the direction of the arrow Y around the first rotational shaft 13. At this point, the rotation of the guide link 12 is suppressed by the elastic force of the buffer rod 39 in the tension direction.

In the third embodiment, the buffer mechanism 19 is arranged on the opposite side across the first rotational shaft 13 from the guide wheel 5, and the buffer mechanism 19 is the buffer rod 39 that connects between the second support portion 18 of the guide link 12 and the buffer mechanism receiving portion 30 of the lateral beam 9. Thus, the rotation of the guide link 12 can be suppressed by the elastic force of the buffer rod 39 in the compression or tension direction when the guide link 12 rotates around the first rotational shaft 13 with the guide wheel 5 contacting with the guide rail 3.

Also, in the third embodiment, the first shaft-like member 35 of the second support portion 18 and the buffer rod 39 are axially coupled to each other via the first elastic bush 40, and the second shaft-like member 38 of the buffer mechanism receiving portion 30 and the buffer rod 39 are axially coupled to each other via the second elastic bush 41. Thus, the load is also absorbed at both ends of the buffer rod 39, and the load from the guide wheel 5 can be further absorbed.

Since the turnbuckle is also provided in the coupling portion between the buffer rod 39 and the respective shaft-like members 35 and 38, the outer width of the guide wheel 5 can be adjusted. Moreover, since the outer width of the guide wheel 5 can be adjusted, the respective components of the guide device can be manufactured at lower processing accuracy. As a result, the cost of manufacturing the vehicle can be reduced.

Also, in the third embodiment, the load is absorbed by employing a rod system using the buffer rod 39. Thus, a common rod body can be used in all the vehicles only by changing buffer characteristics (such as an elastic coefficient) in accordance with the weight or the performance of the vehicle. Therefore, the cost of manufacturing the vehicle can be reduced.

Fourth Embodiment

Figure 10:
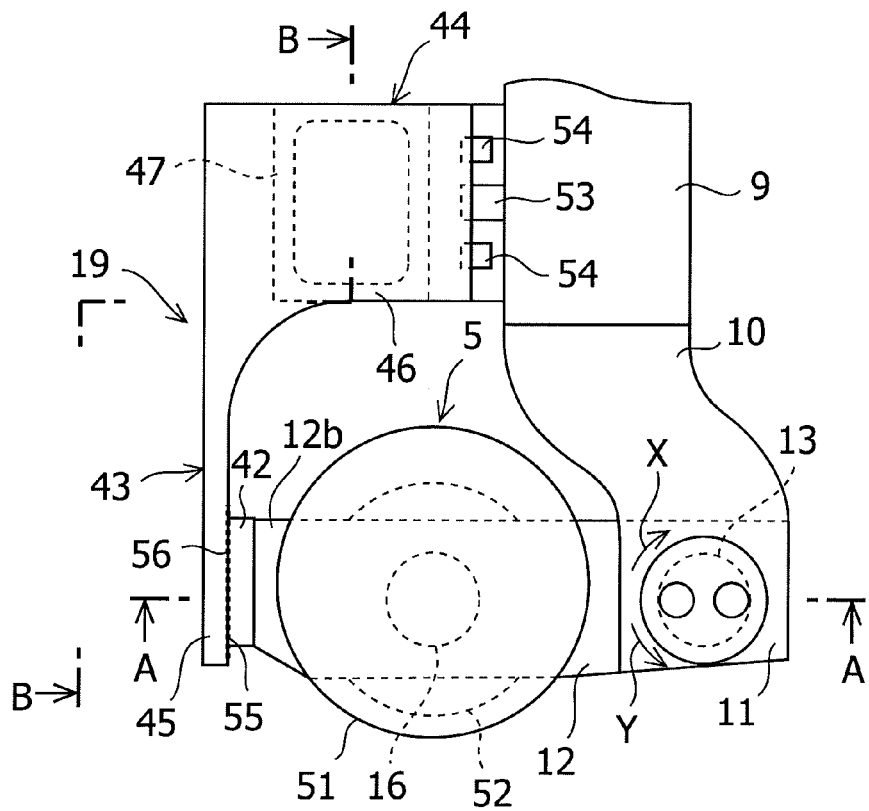
FIG. 10 is a plan view of a guide device of a guide rail type vehicle according to a fourth embodiment of the present invention.
Figure 11:
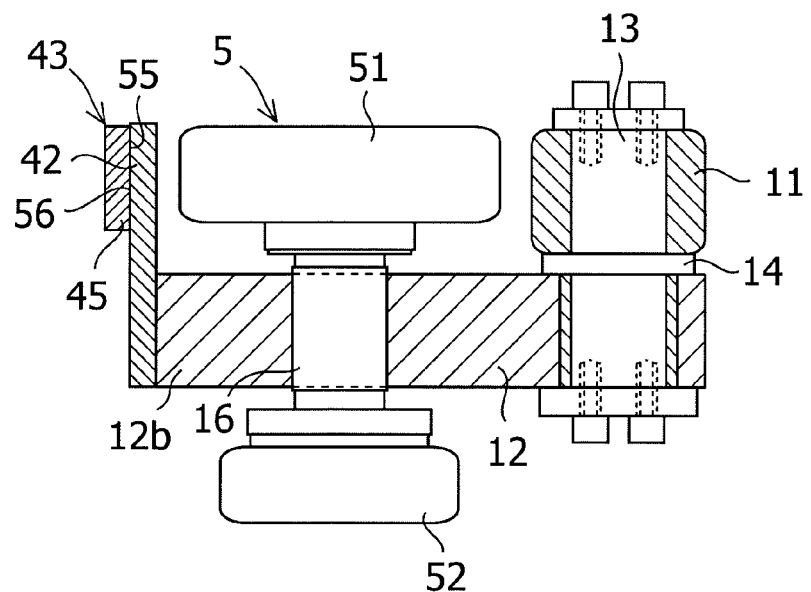
FIG. 11 is a sectional view taken along a line A-A in FIG. 10.
Figure 12:
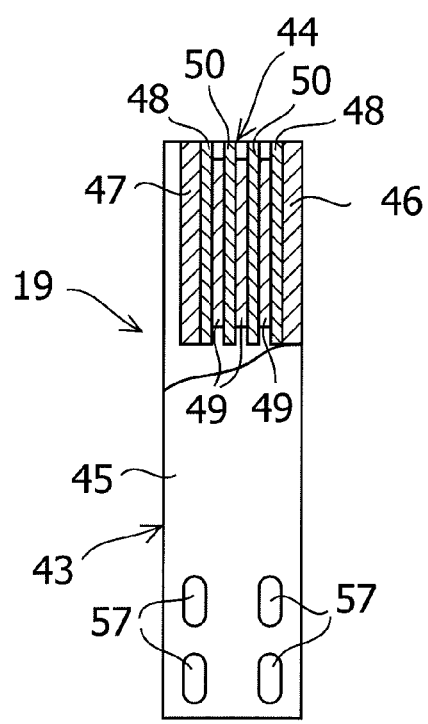
FIG. 12 is a sectional view taken along a line B-B in FIG. 10.

In the following, a guide rail type vehicle according to a fourth embodiment of the present invention will be described by reference to the drawings. FIG. 10 is a plan view of a guide device of the guide rail type vehicle according to the fourth embodiment of the present invention. FIG. 11 is a sectional view taken along a line A-A in FIG. 10. FIG. 12 is a sectional view taken along a line B-B in FIG. 10. The same portions as those described in the aforementioned embodiments are assigned the same reference numerals to omit repeated description.

The fourth embodiment differs from the aforementioned embodiments in that the buffer mechanism 19 is arranged on the opposite side across the guide wheel 5 from the first rotational shaft 13. As shown in FIG. 10, the guide link 12 extends in the vehicle front and rear direction to a position passing over the guide wheel 5 from the guide wheel receiver 11. A buffer mechanism support portion 42 extending in the vertical direction is provided at the end portion 12b of the guide link 12 on the opposite side from the first rotational shaft 13.

As shown in FIG. 10, the buffer mechanism 19 includes a connection member 43 extending in the vehicle width direction, and an elastic member 44 arranged between the connection member 43 and the lateral beam 9. As shown in FIGS. 10 and 12, the connection member 43 includes a first plate-like portion 45 and a second plate-like portion 46. The first plate-like portion 45 extends in the vehicle width direction from the buffer mechanism support portion 42 to the position of the lateral beam 9 such that its width direction is aligned with the vertical direction, and the second plate-like portion 46 extends horizontally from the first plate-like portion 45 to the lateral beam 9 such that its width direction is aligned with the horizontal direction. Meanwhile, the lateral beam 9 includes a third plate-like support portion 47 extending in the same direction as the guide link 12. The second plate-like portion 46 of the connection member 43 and the third support portion 47 of the lateral beam 9 are arranged so as to be parallel to each other.

As shown in FIG. 12, in the fourth embodiment, the elastic member 44 is arranged between the second plate-like portion 46 of the connection member 43 and the third support portion 47 of the lateral beam 9 via upper and lower seat plates 48. The elastic member 44 includes a plurality of rectangular buffer rubbers 49 and a plurality of rectangular metal plates 50. The buffer rubbers 49 and the metal plates 50 are alternately layered with their planar portions being horizontally arranged. The buffer rubbers 49 and the metal plates 50 are fixed to each other with an adhesive. With the configuration, the buffer rubbers 49 of the elastic member 44 receive in the shear direction the load applied between the second plate-like portion 46 of the connection member 43 and the third support portion 47 of the lateral beam 9 when the guide link 12 rotates around the first rotational shaft 13.

As shown in FIG. 10, in the fourth embodiment, a stopper 53 is also provided at the third support portion 47 of the lateral beam 9 so as to project upward toward the second plate-like portion 46 of the connection member 43. Meanwhile, a pair of stopper receivers 54 are provided at the second plate-like portion 46 of the connection member 43 so as to project downward toward the third support portion 47. The pair of stoppers 54 are arranged with a gap from the stopper 53 in the vehicle width direction.

Also, as shown in FIGS. 10 and 11, a plurality of grooves 55 extending in the vertical direction are formed parallel to each other in the vehicle width direction in the outer surface of the buffer mechanism support portion 42. Meanwhile, a plurality of groove receiving portions 56 extending in the vertical direction are formed parallel to each other in the vehicle width direction in the surface of the first plate-like portion 45 of the connection member 43 corresponding to the buffer mechanism support portion 42. A plurality of long holes 57 extending in the vehicle width direction are also provided at a position of the first plate-like portion 45 in which the groove receiving portions 56 are provided. With this configuration, the buffer mechanism support portion 42 of the guide link 12 and the first plate-like portion 45 of the connection member 43 are connected to each other with the grooves 55 and the groove receiving portions 56 being engaged with each other, and are also fixed to each other by inserting fastening members such as bolts (not shown) into the long holes 57.

Therefore, in the fourth embodiment, when the main guide wheel 51 receives the force from outside of the vehicle width direction upon contacting with the main guide rail 31, the guide link 12 rotates in the direction of the arrow X around the first rotational shaft 13. At this point, the buffer rubbers 49 of the elastic member 44 are shear-deformed, to thereby suppress the rotation of the guide link 12.

Meanwhile, when the branch guide wheel 52 receives the force from inside of the vehicle width direction upon contacting the branch guide rail 32, the guide link 12 rotates in the direction of the arrow Y around the first rotational shaft 13. At this point, the buffer rubbers 49 of the elastic member 44 are similarly shear-deformed, to thereby suppress the rotation of the guide link 12.

In the fourth embodiment, the buffer mechanism 19 includes the connection member 43 that connects the end portion 12b of the guide link 12 on the opposite side across the guide wheel 5 from the first rotational shaft 13 and the lateral beam 9, and the elastic member 44 arranged between the connection member 43 and the lateral beam 9, and the elastic member 44 includes the plurality of rectangular buffer rubbers 49 and the plurality of rectangular metal plates 50. The buffer rubbers 49 of the elastic member 44 receive in the shear direction the load applied between the second plate-like portion 46 of the connection member 43 and the third support portion 47 of the lateral beam 9 when the guide link 12 rotates around the first rotational shaft 13. Thus, when the guide link 12 rotates around the first rotational shaft 13 with the guide wheel 5 contacting with the guide rail 3, the buffer rubbers 49 are shear-deformed, to thereby suppress the rotation of the guide link 12. In particular, while the load is absorbed in the compression direction of the elastic member in the conventional case, the above embodiment is configured such that the load is received in the shear direction in which the buffer rubbers 49 are more flexibly deformed. Accordingly, the load from the guide wheel 5 can be more absorbed as compared to the conventional case.

Also, in the fourth embodiment, the guide wheel 5 is supported on both ends by the guide wheel receiver 11 and the connection member 43. Thus, when the guide link 12 rotates around the first rotational shaft 13 with the main guide wheel 51 contacting with the main guide rail 31, the load is not concentrated around the first rotational shaft 13, and uneven wear on the bush or the like supporting the first rotational shaft 13 can be further reduced. Accordingly, less maintenance work is required on the vehicle.

In the fourth embodiment, the plurality of grooves 55 extending in the vertical direction are formed parallel to each other in the vehicle width direction in the outer surface of the buffer mechanism support portion 42, and the plurality of groove receiving portions 56 extending in the vertical direction are formed parallel to each other in the vehicle width direction in the surface of the first plate-like portion 45 of the connection member 43 corresponding to the buffer mechanism support portion 42. The buffer mechanism support portion 42 of the guide link 12 and the first plate-like portion 45 of the connection member 43 are connected to each other with the grooves 55 and the groove receiving portions 56 being engaged with each other. Thus, the engagement position between the groove 55 and the groove receiving portion 56 can be adjusted in the vehicle width direction, and the outer width of the guide wheel 5 can be thereby adjusted. Furthermore, the outer width of the guide wheel 5 can be adjusted only by shifting the engagement position between the groove 55 and the groove receiving portion 56 one by one. Therefore, the outer width of the guide wheel 5 can be adjusted on a fine scale and in a simple manner.

Also, since the outer width of the guide wheel 5 can be adjusted, the respective components of the guide device can be manufactured at lower processing accuracy. As a result, the cost of manufacturing the vehicle can be reduced.

Fifth Embodiment

Figure 13:
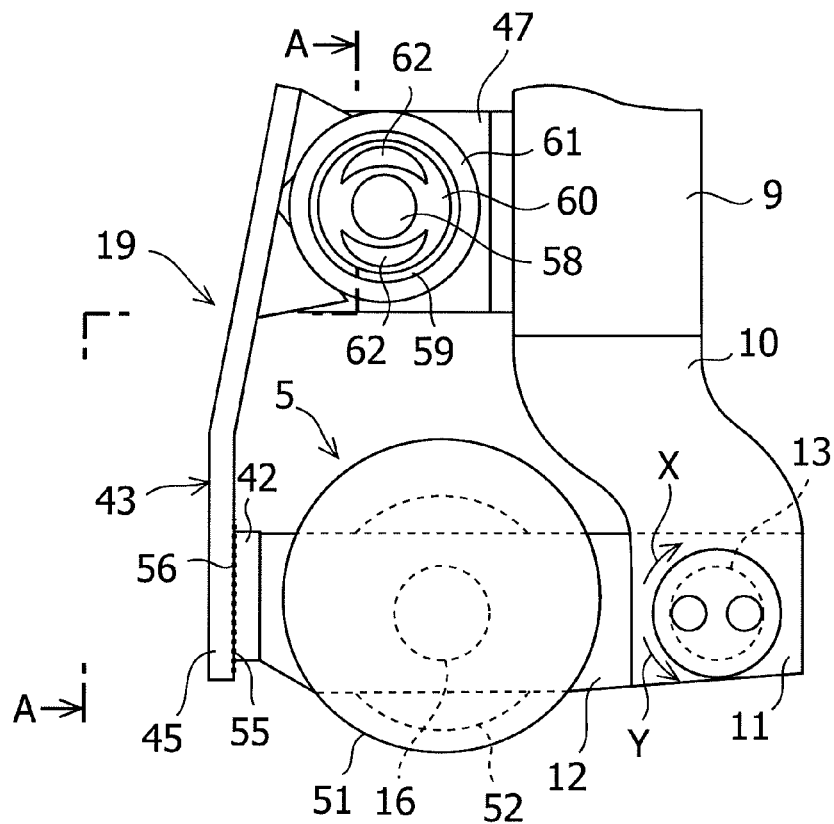
FIG. 13 is a plan view of a guide device of a guide rail type vehicle according to a fifth embodiment of the present invention.
Figure 14:
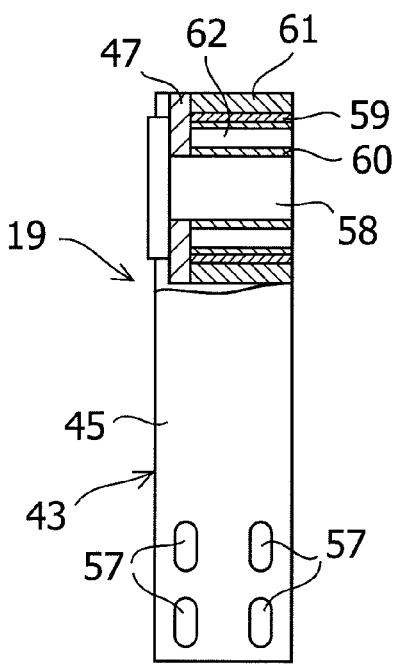
FIG. 14 is a sectional view taken along a line A-A in FIG. 13.

In the following, a guide rail type vehicle according to a fifth embodiment of the present invention will be described by reference to the drawings. FIG. 13 is a plan view of a guide device of the guide rail type vehicle according to the fifth embodiment of the present invention. FIG. 14 is a sectional view taken along a line A-A in FIG. 13. The same portions as those described in the aforementioned embodiments are assigned the same reference numerals to omit repeated description.

As shown in FIGS. 13 and 14, in the fifth embodiment, the buffer mechanism 19 includes a shaft member 58 arranged between the connection member 43 and the third support portion 47 of the lateral beam 9 so as to be parallel to the first rotational shaft 13, a cylindrical receiving member 59 arranged so as to surround the shaft member 58, and a cylindrical buffer rubber 60 arranged between the shaft member 58 and the cylindrical receiving member 59.

As shown in FIGS. 13 and 14, the shaft member 58 is fixed to the third support portion 47 of the lateral beam 9. Meanwhile, the connection member 43 includes a cylindrical portion 61 at a position corresponding to the third support portion 47 of the lateral beam 9. The cylindrical receiving member 59 is arranged within the cylindrical portion 61 of the connection member 43.

Also, as shown in FIGS. 13 and 14, a plurality of slits 62 are formed in the cylindrical buffer rubber 60 in the direction planarly perpendicular to the direction of the load applied to the guide wheel 5. The plurality of slits 62 are formed symmetrically with respect to the shaft member 58. That is, the cylindrical buffer rubber 60 of the buffer mechanism 19 can be elastically deformed within the cylindrical receiving member 59 by providing the slits 62. With the configuration, the cylindrical buffer rubber 60 is elastically deformed to absorb the load applied to the shaft member 58 when the guide link 12 rotates around the first rotational shaft 13.

Therefore, in the fifth embodiment, when the main guide wheel 51 receives the force from outside of the vehicle width direction upon contacting with the main guide rail 31, the guide link 12 rotates in the direction of the arrow X around the first rotational shaft 13. At this point, the cylindrical buffer rubber 60 of the buffer mechanism 19 is shear-deformed, to thereby suppress the rotation of the guide link 12.

Meanwhile, when the branch guide wheel 52 receives the force from inside of the vehicle width direction upon contacting with the branch guide rail 32, the guide link 12 rotates in the direction of the arrow Y around the first rotational shaft 13. At this point, the cylindrical buffer rubber 60 of the buffer mechanism 19 is similarly shear-deformed, to thereby suppress the rotation of the guide link 12.

In the fifth embodiment, the buffer mechanism 19 includes the shaft member 58 arranged between the connection member 43 and the third support portion 47 of the lateral beam 9 so as to be parallel to the first rotational shaft 13, the cylindrical receiving member 59 arranged so as to surround the shaft member 58, and the cylindrical buffer rubber 60 arranged between the shaft member 58 and the cylindrical receiving member 59. Thus, when the guide link 12 rotates around the first rotational shaft 13 with the guide wheel 5 contacting with the guide rail 3, the shaft member 58 is displaced toward the slit 62, to thereby shear-deform the cylindrical buffer rubber 60. While the load is absorbed in the compression direction of the elastic member in the conventional case, the above embodiment is configured such that the load is received in the shear direction in which the elastic member is more flexibly deformed. Thus, the load from the guide wheel 5 can be more absorbed as compared to the conventional case.

Also, when the shaft member 58 is displaced within the cylindrical receiving member 59, the rigidity of the cylindrical buffer rubber 60 is increased at a point in which the slit 62 is squashed, so that the displacement of the shaft member 58 is restricted. Accordingly, with the configuration, excessive rotation of the guide link 12 can be restricted without separately providing a stopper.

Sixth Embodiment

Figure 15:
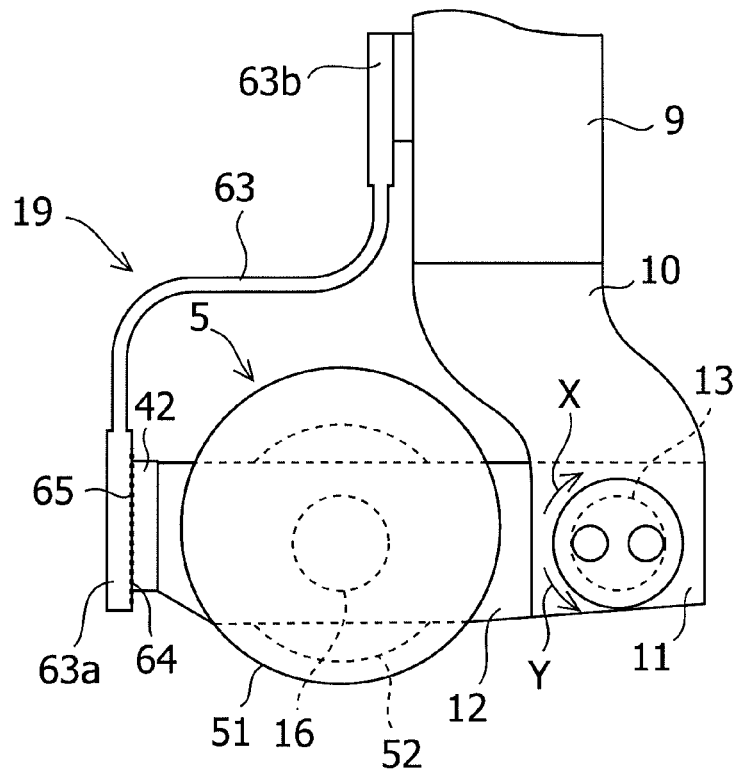
FIG. 15 is a plan view of a guide device of a guide rail type vehicle according to a sixth embodiment of the present invention.
Figure 16:
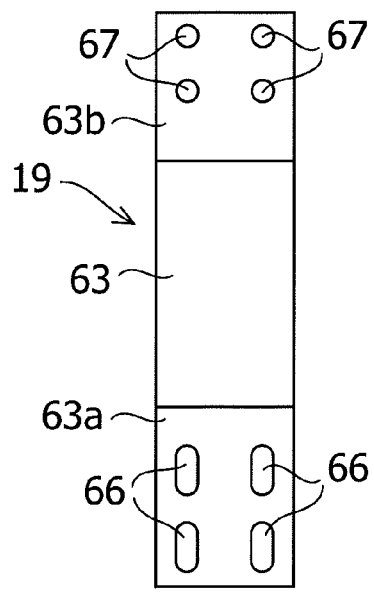
FIG. 16 is a view of a plate-like elastic member in FIG. 15 as viewed from the lateral side.
Figure 17:
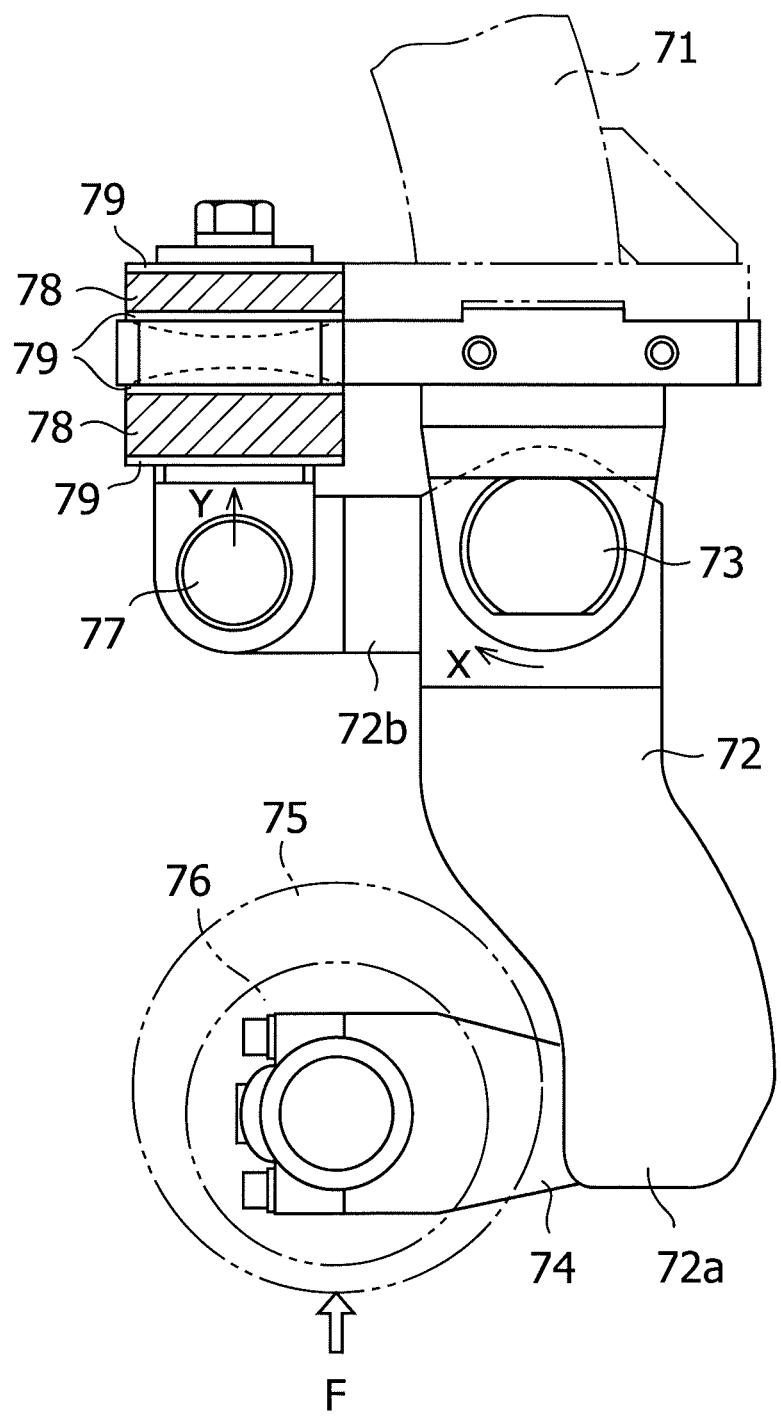
FIG. 17 is a view illustrating an example of a guide device of a conventional guide rail type vehicle.
Figure 18:
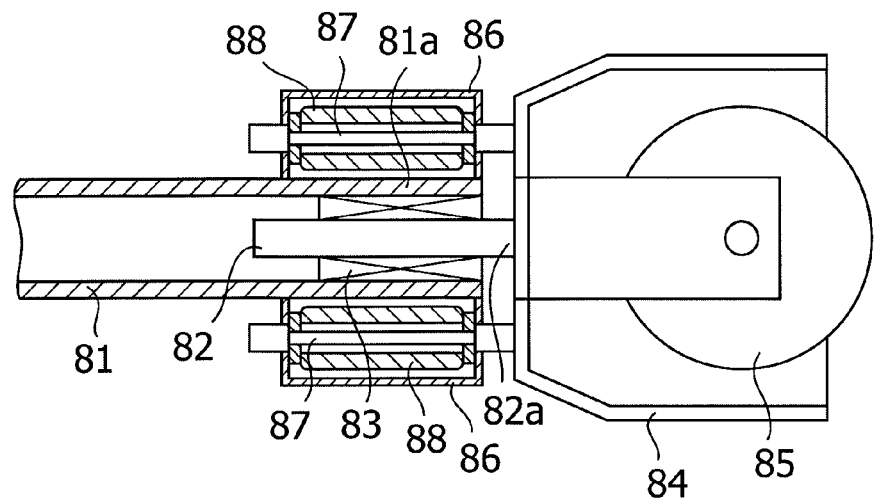
FIG. 18 is a view illustrating another example of a guide device of a conventional guide rail type vehicle.
Figure 19:
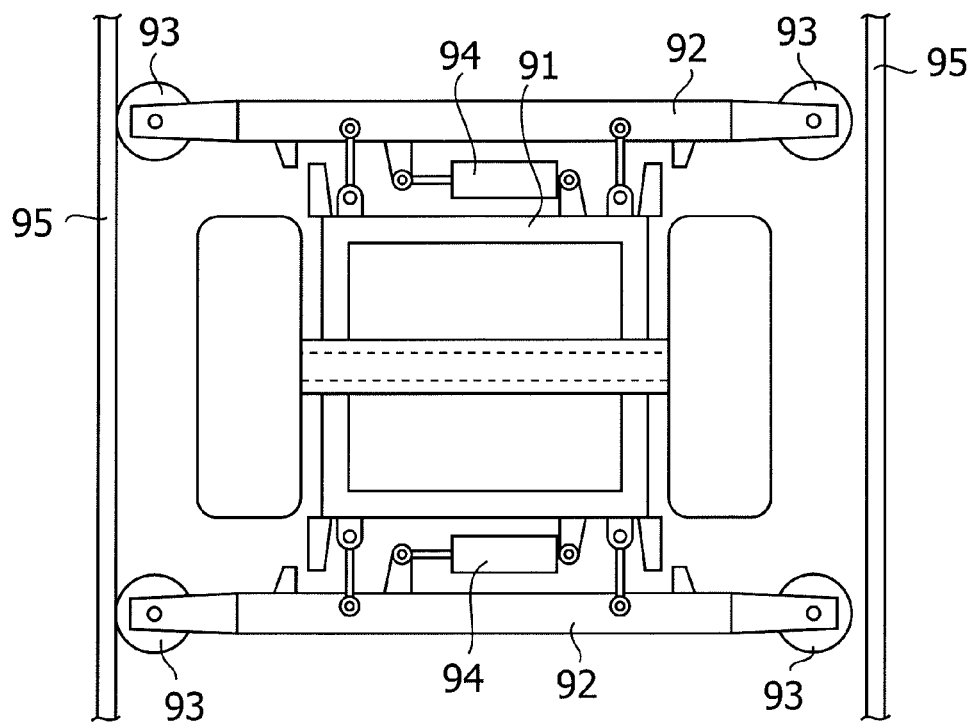
FIG. 19 is a view illustrating yet another example of a guide device of a conventional guide rail type vehicle.

In the following, a guide rail type vehicle according to a sixth embodiment of the present invention will be described by reference to the drawings. FIG. 15 is a plan view of a guide device of the guide rail type vehicle according to the sixth embodiment of the present invention. FIG. 16 is a view of a plate-like elastic member in FIG. 15 as viewed from the side surface. The same portions as those described in the aforementioned embodiments are assigned the same reference numerals to omit repeated description.

As shown in FIGS. 15 and 16, in the sixth embodiment, the buffer mechanism 19 includes a plate-like elastic member 63 that connects between the buffer mechanism support portion 42 and the lateral beam 9. The plate-like elastic member 63 is formed in a crank shape from the buffer mechanism support portion 42 to the lateral beam 9, and arranged such that its width direction is aligned with the vertical direction.

As shown in FIGS. 15 and 16, a plurality of grooves 64 extending in the vertical direction are formed parallel to each other in the vehicle width direction in the outer surface of the buffer mechanism support portion 42. Meanwhile, a plurality of groove receiving portions 65 extending in the vertical direction are formed parallel to each other in the vehicle width direction in the surface of an end portion 63a of the plate-like elastic member 63 corresponding to the buffer mechanism support portion 42. A plurality of long holes 66 extending in the vehicle width direction are also provided at a position of the plate-like elastic member 63 in which the groove receiving portions 65 are provided. With the configuration, the buffer mechanism support portion 42 of the guide link 12 and the plate-like elastic member 63 are connected to each other with the grooves 64 and the groove receiving portions 65 being engaged with each other, and are also fixed to each other by inserting fastening members such as bolts (not shown) into the long holes 66.

As shown in FIG. 16, a plurality of round holes 67 are also provided at an end portion 63b of the plate-like elastic member 63 on the lateral beam 9 side. The plate-like elastic member 63 and the lateral beam 9 are fixed to each other by inserting fastening members such as bolts (not shown) into the round holes 67.

Accordingly, in the sixth embodiment, when the main guide wheel 51 receives the force from outside of the vehicle width direction upon contacting with the main guide rail 31, the guide link 12 rotates in the direction of the arrow X around the first rotational shaft 13. At this point, the rotation of the guide link 12 is suppressed by the flexibility of the plate-like elastic member 63.

Meanwhile, when the branch guide wheel 52 receives the force from inside of the vehicle width direction upon contacting with the branch guide rail 32, the guide link 12 rotates in the direction of the arrow Y around the first rotational shaft 13. At this point, the rotation of the guide link 12 is also suppressed by the flexibility of the plate-like elastic member 63.

In the sixth embodiment, the buffer mechanism 19 is arranged on the opposite side across the guide wheel 5 from the first rotational shaft 13, the buffer mechanism 19 is the plate-like elastic member 63 that connects between the buffer mechanism support portion 42 on the opposite side from the end portion of the guide link 12 on the first rotational shaft 13 side and the lateral beam 9, and the plate-like elastic member 63 is formed in a crank shape from the buffer mechanism support portion 42 to the lateral beam 9 and arranged such that its width direction is aligned with the vertical direction. Thus, the rotation of the guide link 12 can be suppressed by the flexibility of the plate-like elastic member 63 when the guide link 12 rotates around the first rotational shaft 13 with the guide wheel 5 contacting with the guide rail 3.

In the sixth embodiment, the plate-like elastic member 63 is a member which is not worn nor changed with time. Thus, the plate-like elastic member is replaced less frequently as compared to another component on which wear could occur. Accordingly, less maintenance work is required on the vehicle.

Although the embodiments of the present invention have been described above, the present invention is not limited to the aforementioned embodiments, and various modifications and changes may be made based on the technical concept of the present invention.

Although the buffer rubbers 21 and 49 are shear-deformed to absorb the load from the guide wheel 5 in the above first and fourth embodiments, the load may be absorbed not only by the shear deformation but also by the elastic force in the compression and tension directions.

In the above second embodiment, the shaft member 25 is fixed to the second support portion 18 of the guide link 12 by the fastening members 28 such as bolts, and the cylindrical receiving member 26 is mounted to the first support portion 17 of the guide wheel receiver 11. As a modified embodiment thereof, the shaft member 25 may be mounted to the first support portion 17 of the guide wheel receiver 11, and the cylindrical receiving member 26 may be mounted to the second support portion 18 of the guide link 12.

Although the buffer rod 39 has the damper function in the above third embodiment, the rod portion may include only the turnbuckle, and both ends may be axially coupled by the elastic bushes according to a required performance.

In the above fifth embodiment, the shaft member 58 is fixed to the third support portion 47 of the lateral beam 9, and the connection member 43 includes the cylindrical portion 61. As a modified embodiment thereof, the shaft member 58 may be provided at the connection member 43, and the cylindrical portion 61 may be provided at the third support portion 47 of the lateral beam 9.

REFERENCE SIGNS LIST

1: Truck
2: Running track
3: Guide rail
4: Guide frame
5: Guide wheel
6: Axle
7: Running wheel
8: Longitudinal beam
9: Lateral beam
10: Guide arm
11: Guide wheel receiver
12: Guide link
13: First rotational shaft
14: Flange of the first rotational shaft
15: Fastening member
16: Second rotational shaft
17: First support portion
18: Second support portion
19: Buffer mechanism
20: Seat plate
21, 49: Buffer rubber
22, 50: Metal plate
23, 53: Stopper
24, 54: Stopper receiver
25, 58: Shaft member
26, 59: Cylindrical receiving member
27, 60: Cylindrical buffer rubber
28: Fastening member
29, 62: Slit
30: Buffer mechanism receiving portion
31: Main guide rail
32: Branch guide rail
33, 34: Plate-like member
35: First shaft-like member
36: Support member
37: Fastening member
38: Second shaft-like member
39: Buffer rod
40: First elastic bush
41: Second elastic bush
42: Buffer mechanism support portion
43: Connection member
44: Elastic member
45: First plate-like portion
46: Second plate-like portion
47: Third support portion
48: Seat plate
51: Main guide wheel
52: Branch guide wheel
55, 64: Groove
56, 65: Groove receiving portion
57, 66: Long hole
61: Cylindrical portion
63: Plate-like elastic member
67: Round hole
71: (Conventional) Lateral beam
72: (Conventional) L-shaped guide arm
73: (Conventional) Pin
74: (Conventional) Guide bearing
75: (Conventional) Main guide wheel
76: (Conventional) Branch guide wheel
77: (Conventional) Guide shaft
78: (Conventional) Buffer rubber
79: (Conventional) Rubber seat
81: (Conventional) Guide arm
82: (Conventional) Reciprocation rod
83: (Conventional) Guide tube
84: (Conventional) Guide wheel bracket
85: (Conventional) Guide wheel 86: (Conventional) Guide portion
87: (Conventional) Guide rod
88: (Conventional) Buffer spring
91: (Conventional) Guide frame
92: (Conventional) Guide lateral beam
93: (Conventional) Guide wheel
94: (Conventional) Buffer rod
95: (Conventional) Guide rail

What is claimed is:

1. A guide rail type vehicle with a guide device comprising a guide rail provided on both sides of a running track, and a guide wheel mounted to a guide frame on the vehicle side, the guide wheel rolling in contact with the guide rail to guide the vehicle,
wherein the guide wheel includes a main guide wheel that rolls in contact with a main guide rail of the guide rail provided along the running track and a branch guide wheel that rolls in contact with a branch guide rail of the guide rail provided at a branch position of the running track,
wherein the guide frame includes a guide arm that extends in a vehicle width direction and a guide link mounted to an end portion in the vehicle width direction of the guide arm, the guide arm and the guide link being rotatably connected to each other via a first rotational shaft,
wherein the guide link includes a second rotational shaft in which the main guide wheel and the branch guide wheel are rotatably mounted to both ends, and
wherein a buffer mechanism is provided between the guide arm and the guide link, and when the guide link rotates around the first rotational shaft with the guide wheel contacting with the guide rail, the buffer mechanism suppresses rotation of the guide link.

2. The guide rail type vehicle according to claim 1, wherein the buffer mechanism is arranged on an opposite side across the first rotational shaft from the guide wheel, and the buffer mechanism is an elastic member.

3. The guide rail type vehicle according to claim 2, wherein the elastic member is arranged so as to be parallel to the first rotational shaft such that both ends thereof are mounted to the guide arm and the guide link, and the elastic member receives in a shear direction a load applied when the guide link rotates around the first rotational shaft.

4. The guide rail type vehicle according to claim 1, wherein the buffer mechanism is arranged on an opposite side across the first rotational shaft from the guide wheel, the buffer mechanism includes a shaft member arranged between the guide arm and the guide link so as to be parallel to the first rotational shaft, a cylindrical receiving member arranged so as to surround the shaft member, and a cylindrical elastic member arranged between the shaft member and the cylindrical receiving member, and a plurality of slits are formed in the cylindrical elastic member in a direction planarly perpendicular to a direction of a load applied to the guide wheel, and are arranged symmetrically with respect to the shaft member.

5. The guide rail type vehicle according to claim 1, wherein the guide arm includes a guide wheel receiver at an end portion on an outer side of the vehicle width direction, the guide link is rotatably mounted to the guide wheel receiver via the first rotational shaft, the buffer mechanism is arranged on an opposite side across the first rotational shaft from the guide wheel, and the buffer mechanism is a buffer spring that connects between an end portion of the guide link on the first rotational shaft side and the guide frame.

6. The guide rail type vehicle according to claim 5, wherein the guide link and the buffer spring are axially coupled to each other via an elastic bush or a spherical bush, and the guide frame and the buffer spring are axially coupled to each other via an elastic bush or a spherical bush.

7. The guide rail type vehicle according to claim 1, wherein the buffer mechanism includes a connection member that connects between an end portion of the guide link on an opposite side across the guide wheel from the first rotational shaft and the guide frame, and an elastic member arranged between the connection member and the guide frame.

8. The guide rail type vehicle according to claim 7, wherein the elastic member is arranged so as to be parallel to the first rotational shaft such that both ends thereof are mounted to the connection member and the guide frame, and the elastic member receives in a shear direction a load applied when the guide link rotates around the first rotational shaft.

9. The guide rail type vehicle according to claim 1, wherein the buffer mechanism includes a connection member that connects between an end portion of the guide link on an opposite side across the guide wheel from the first rotational shaft and the guide frame, a shaft member arranged between the connection member and the guide frame so as to be parallel to the first rotational shaft, a cylindrical receiving member arranged so as to surround the shaft member, and a cylindrical elastic member arranged between the shaft member and the cylindrical receiving member, and a plurality of slits are formed in the cylindrical elastic member in a direction planarly perpendicular to a direction of a load applied to the guide wheel, and are arranged symmetrically with respect to the shaft member.

10. The guide rail type vehicle according to claim 7, wherein a plurality of grooves extending in a vertical direction are formed parallel to each other in the vehicle width direction in an outer surface of the end portion of the guide link on the connection member side, a plurality of groove receiving portions extending in the vertical direction are formed parallel to each other in the vehicle width direction in an outer surface of an end portion of the connection member on the guide link side, and the guide link and the connection member are connected to each other with the grooves and the groove receiving portions being engaged with each other.

11. The guide rail type vehicle according to claim 1, wherein the buffer mechanism is arranged on an opposite side across the guide wheel from the first rotational shaft, the buffer mechanism is a plate-like elastic member that connects between an end portion of the guide link on an opposite side from an end portion on the first rotational shaft side and the guide frame, and the plate-like elastic member is formed in a crank shape from the guide link to the guide frame, and is arranged such that a width direction thereof is aligned with a vertical direction.

12. The guide rail type vehicle according to claim 11, wherein a plurality of grooves extending in the vertical direction are formed parallel to each other in the vehicle width direction in an outer surface of the end portion of the guide link on the elastic member side, a plurality of groove receiving portions extending in the vertical direction are formed parallel to each other in the vehicle width direction in an outer surface of an end portion of the plate-like elastic member on the guide link side, and the guide link and the plate-like elastic member are connected to each other with the grooves and the groove receiving portions being engaged with each other.

* * * * *